United States Patent [19]

Merritt et al.

[11] Patent Number: 4,515,769

[45] Date of Patent: * May 7, 1985

[54] ENCAPSULATED FLAVORANT MATERIAL, METHOD FOR ITS PREPARATION, AND FOOD AND OTHER COMPOSITIONS INCORPORATING SAME

[75] Inventors: Carleton G. Merritt, Syracuse; Winston H. Wingerd, Camillus; David J. Keller, Weedsport, all of N.Y.

[73] Assignee: Borden, Inc., Columbus, Ohio

[*] Notice: The portion of the term of this patent subsequent to May 31, 2000 has been disclaimed.

[21] Appl. No.: 463,336

[22] Filed: Feb. 2, 1983

Related U.S. Application Data

[63] Continuation-in-part of Ser. No. 326,188, Dec. 1, 1981, Pat. No. 4,386,104.

[51] Int. Cl.³ ............ A23L 1/221; A61K 7/16; A24C 5/47
[52] U.S. Cl. ............ 424/49; 426/3; 426/96; 426/103; 426/534; 426/650; 426/98; 426/651; 131/274; 131/275
[58] Field of Search ............ 426/3–6, 426/103, 96, 534, 650, 651, 98; 252/316; 131/274; 424/49

[56] References Cited

U.S. PATENT DOCUMENTS

| | | | |
|---|---|---|---|
| 2,369,847 | 2/1945 | Olsen et al. | 99/140 |
| 2,372,873 | 4/1945 | Zappert et al. | 95/7 |
| 2,876,160 | 3/1959 | Schock et al. | 167/82 |
| 2,886,445 | 5/1959 | Rosenthal et al. | 99/135 |
| 2,886,446 | 5/1959 | Rosenthal et al. | 99/135 |
| 2,886,448 | 5/1959 | Rosenthal et al. | 99/135 |
| 3,232,764 | 2/1966 | Allen et al. | 96/111 |
| 3,795,744 | 3/1974 | Ogawa et al. | 426/3 |
| 3,803,045 | 4/1974 | Matsukawa et al. | 252/316 |
| 3,819,838 | 6/1974 | Smith et al. | 426/89 |
| 3,826,847 | 7/1974 | Ogawa et al. | 426/3 |
| 3,857,964 | 12/1974 | Yolles | 426/3 |
| 3,920,849 | 11/1975 | Marmo et al. | 426/3 |
| 3,957,964 | 5/1976 | Grimm | 424/10 |
| 3,962,463 | 6/1976 | Witzel | 426/5 |
| 4,001,438 | 1/1977 | Marmo et al. | 426/96 |
| 4,206,301 | 6/1980 | Yolles | 536/3 |
| 4,276,312 | 6/1981 | Merritt | 426/96 |
| 4,277,364 | 7/1981 | Shasha et al. | 252/316 |
| 4,386,106 | 5/1983 | Merritt et al. | 426/5 |

FOREIGN PATENT DOCUMENTS 0024297  7/1980  European Pat. Off.

*Primary Examiner*—Jeanette Hunter
*Attorney, Agent, or Firm*—George P. Maskas; Kenneth P. Van Wyck

[57] ABSTRACT

The invention provides an encapsulated flavorant composition for use in food and other compositions intended for introduction into the mouth. This composition is prepared by the steps of forming an emulsion of flavoring agent in a partially hydrophilic matrix material comprising gelatin, a natural gum or albumin and plasticizer; drying the emulsion to a solid matrix; grinding to a solid base powder; and then coating the base powder with a water insoluble material which will prevent elution of flavor from the base powder and will not immediately dissolve under the hydrolytic condition of the mouth yet which, when chewed, or otherwise worked in the mouth, will give a substantial flavor "burst" and sustained flavor release as the hydrophilic base powder matrix is wetted in the mouth. The encapsulated flavorant composition may be used in chewing gum, candies and other foods, toothpaste, chewing tobacco and snuff.

57 Claims, No Drawings

ENCAPSULATED FLAVORANT MATERIAL, METHOD FOR ITS PREPARATION, AND FOOD AND OTHER COMPOSITIONS INCORPORATING SAME

This application is a continuation-in-part of our co-pending application Ser. No. 06/326188 filed Dec. 1, 1981, now U.S. Pat. No. 4,386,104.

BACKGROUND OF THE INVENTION

The present invention relates to a method for preparing a encapsulated flavorant material in solid particular form for use in chewable compositions such as foods, confections and other orally utilized compositions, especially chewing gum, toothpaste, chewing tobacco and snuff. The flavorant material can provide both delayed release of flavor and release of a substantial flavor peak or "burst" of flavor with sustained release of substantially all of the encapsulated flavorant ingredient.

The invention further relates to a flavorant material comprising a solid encapsulated and coated flavorant matrix containing flavorant ingredients such as essential oil, spice, oleo resin and artificial flavorants containing substantially all of the relatively volatile flavor components or "low boilers" of the flavorant ingredients, e.g. acetaldehyde and butyl acetate, which are conventionally lost in preparation of prior art spray dried flavorant products.

The invention also relates to a flavored composition for introduction into the mouth, such as a food product, chewing tobacco, snuff or toothpaste, containing the encapsulated flavorant of the invention. In particular, the invention provides an improved controlled, variable flavored chewing gun composition prepared by incorporating a delayed release encapsulated flavorant material of the invention, with or without conventional free oil flavorants, in a chewing gum base.

The invention is also directed to a process for preparing water insoluble flavorant ingredients in a solid matrix of partially water soluble or hydrophilic encapsulation material comprising gelatin, a plasticizer and either a natural gum or an albumin, which provides for ready elution of flavorant ingredient at substantial flavor peaks under the hydrolytic condition in the mouth and yet which is coated with a water insoluble material which provides for delayed release of substantially all of the flavorant ingredient without having flavor oil dissolve in the water insoluble coating or the gum base, which has produced flavor "chew-out" problems in prior art products.

Over the years, there has been a considerable amount of work in the field of flavorant materials for use in orally chewable compositions such as medicines, toothpaste, tobacco and particularly chewing gum. Much of this work has been directed to the need for developing flavorant materials which will give a substantial initial flavor level or flavor burst and yet will give sustained release of flavor at interesting levels over an extended period of time.

Thus, it has long been recognized in the art that the addition of free flavor oil to gum bases, as is still conventionally practiced in the field, results in the release of only about 20–40% of the initial flavor oil upon chewing due to the fact that 60–80% of the initial flavor oil is entrapped or bound within the gum base and cannot be chewed out over an indefinite period of time.

In response to this problem, it has been long known in the art to seal or microencapsulate flavorant ingredients in colloids such as gum arabic, dextrin, starch and gelatin to prevent diffusion of the flavor oil into the gum base. Thus, for example, U.S. Pat. Nos. 1,526,039 and 2,369,847 teach the encapsulation of essential oils in emulsifying material, including common gums and gelatin, to prevent the flavor from escaping and having direct contact with the gum base.

U.S. Pat. Nos. 2,886,440; 2,886,445; 2,886,446; and 2,886,449 all describe flavorant materials for chewing gum prepared by encapsulating flavor oil in gelatin by spray drying, coacervation, and gelatin hardening to obtain extended flavor perception time and obtain a high degree of flavor release.

More recent works in the field, as shown in U.S. Pat. Nos. 3,957,964 which describes thick or multiple coating of hardened gelatin; 3,920,849 and 4,001,438 which review encapsulation teachings with gelatin including mixture of free oil and gelatin encapsulated flavorants; and one of the Co-Applicant's own U.S. Pat. No. 4,276,312 which teaches spray drying of gum arabic, maltodextrins and hydrolyzed gelatin encapsulated flavor oil without loss of low boiler components of the oil, also are directed to achieving substantial release of flavorant ingredient over an extended period of time without significant loss of flavorant ingredient in the gum base.

More recently, considerable work has been directed to development of a delayed release flavorant material which will give delayed release of flavorant ingredient and yet which will readily release a substantial amount of flavor over an extended period of time after conventional flavorant ingredients such as free oils are normally dissipated from the mouth by normal elution with saliva. The obvious benefit of delayed release is the ability to give flavor variable chewing gum having distinct flavors not previously attainable by mere administration of conventional seasonings and flavor oils.

Prior art attempts at achieving delayed release have all relied upon the use of a coating or matrix of water insoluble material surrounding and in direct contact with the flavoring oil or spice being coated, which has attained diffusion of the flavorant ingredient into the insoluble material, such as polyvinyl acetate, proteins, gelatin or other high molecular weight natural and synthetic resins. Where these prior art processes have succeeded in achieving any degree of delayed release, which is not of the order of that achieved in the instant invention, it has been achieved at the expense of the problem of flavorant ingredient chew-out of a substantial amount of flavor which has become dissolved or "fixed" in the insoluble coating matrix.

Thus, for example, in U.S. Pat. No. 3,795,744 a flavorant ingredient such as essential oils, sweeteners, spices, etc. has been encapsulated within a matrix or alternatively a coating of polyvinyl ester water insoluble material for delayed release of flavorant ingredient when the flavorant ingredient is uniformly distributed, together with a "quick release" i.e. commercially prepared flavorant ingredient, in a chewing gum base for variable flavor gums. This process, which is directed to achieving controlled flavor release, results in a substantial amount of flavorant ingredient which cannot be "chewed-out" over an indefinite period of time and does not give a substantial flavor "burst" after a delayed period corresponding to the time when conventional flavorant ingredients are dissipated in the mouth.

Similarly, a recent European Patent Application No. 80104076.7 (Publication No. 24,297) of Gergly for "Flavoring Product with Gradually Released Action and Procedures for Its Manufacture," published Mar. 4, 1981, claims delayed release of flavorant ingredients in chewing gum through incorporation of flavor essential oils, etc., in a matrix of at least one water insoluble material in which a softener has been embedded to delay release of the flavorant ingredient until a first flavorant ingredient has been dissipated from the mouth and yet to thereafter release the flavorant ingredient "in logarithmic proportions" after this delay. This process also results in substantial dissolution of the flavorant ingredient in the water insoluble matrix with attendant loss of available flavor due to problem of "chew-out".

Applicants' process, alone, has been successful in both giving time delayed release of flavorant ingredient combined with a burst of flavor and sustained release of substantially all of the originally added flavorant ingredient without problems of fixation of the flavorant ingredient in the water insoluble coating or gum base.

SUMMARY OF THE INVENTION

This invention provides a method for preparing a solid, encapsulated flavorant material for use in compositions intended to be placed in the mouth, the method comprising the steps of:
  (a) preparing an aqueous emulsion of a flavorant ingredient which flavorant ingredient comprises water distillable compounds in an at least partially hydrophilic encapsulation material comprising gelatin, a plasticizer and either a natural gum or an albumin;
  (b) drying said emulsion to produce a uniform solid matrix product having the flavorant ingredient containing substantially all of its water distillable components i.e. low boilers within a solid emulsion matrix of said encapsulation material;
  (c) milling said dried solid matrix to a particle size of less than 20 mesh to produce solid powder; and
  (d) coating said solid power with a water insoluble material selected from the group consisting of polyvinyl acetate, shellac, polyvinyl alcohol, zein, high Bloom gelatin having a Bloom of over 100 to 300 and ethylcellulose to produce an encapsulated flavorant material having a relatively thin water-insoluble coating which delays release of flavorant ingredient within the mouth for a controlled period of time and yet which will thereafter release substantially all of said flavorant ingredient's original flavor notes at desired flavor levels and over a sustained period of time without having significant amounts of said flavorant ingredient dissolve in the water insoluble coating material.

The invention also provides an encapsulated flavorant material for use in compositions intended to be placed in the mouth and comprising a hydrophilic core and a water-insoluble coating surrounding the hydrophilic core; the hydrophilic core comprises a flavorant ingredient having water-distillable components dispersed within a solid matrix of a gelatin-based encapsulation material comprising gelatin, a plasticizer, and either a natural gum or an albumin, while the water insoluble coating comprises a water-insoluble material selected from the group consisting of polyvinyl acetate, shellac, polyvinyl alcohol, zein, high-Bloom gelatin having a Bloom of over 100–300 and ethyl cellulose.

The invention extends to a flavored composition for introduction into the mouth, this composition comprising a non-toxic material selected from the group consisting of food products, chewing tobacco, snuff and toothpaste and an encapsulated flavorant material of the invention or produced by the method of the invention.

The principal object of this invention is to provide an improved flavorant material (and a method for its preparation) which releases its flavorant ingredient only after a flavored material containing the flavorant composition has been placed in the mouth. The instant encapsulated flavorant material avoids loss of the water-distillable components of the flavorant ingredient during storage and achieves a controlled release of flavorant ingredient from a flavored composition using the encapsulated flavorant material. The instant encapsulated flavorant material releases its flavorant ingredient only after the water-insoluble coating has been broken, and thus by controlling the thickness of the water-insoluble coating, the instant encapsulated flavorant material can provide a controlled, delayed release of flavor at substantial flavor intensity levels. This delay in release of flavor from the instant flavorant material can be controlled and the desired delay may of course vary with the nature of the flavorant material and the composition in which it is to be used. For example, the instant encapsulated flavorant material might contain a food additive, such as a sauce or spice, which is desirably added to a food but which cannnot be stored in contact with the food for long periods because of, for example, possible chemical reaction between the food additive and the food itself. By encapsulating the food additive in an instant encapsulated flavorant material, direct contact between the food additive and the food can be avoided so that the encapsulated food additive could be included in a processed food and only released and come into contact with the food when the food is finally eaten by a user.

One particular use of the instant encapsulated flavorant materials is to provide controlled, delayed release of flavor in chewing gums at substantial flavor intensity levels with lower levels of flavor oil than those used in prior art gums at substantially no loss of flavor through dissolution of the flavor oil in the gum base.

A further object of this invention is to provide a method for preparing a flavorant material which gives controlled, delayed release and perceptibly high flavor intensity over a sustained period of chewing wherein substantially all of the initial flavor oil is released without being locked in or dissolved in the gum base, thereby allowing the use of substantially less flavor oil in the final chewing gum product.

A still further object of this invention is to provide an improved chewing gum and method for preparation thereof wherein the chewing gum has two or more distinctly perceptible flavors through use of one or more controlled, delayed release flavorant materials with a conventional free oil or spray dried encapsulated flavorant ingredient.

These and other objects of this invention will become apparent from the following detailed description and preferred embodiment of the invention, which are meant to be illustrative of the invention.

DETAILED DESCRIPTION OF THE INVENTION

The encapsulation method for preparing the delayed release flavorant material of this invention involves a two-step procedure wherein a solid particulate base powder is first prepared by encapsulating a flavorant ingredient in a matrix of partially or slightly hydrophilic or water soluble encapsulation material which is then dried and ground then secondly coating the base powder with a water-insoluble material. The coating with the water-insoluble material prevents the flavorant ingredient from diffusing out of the flavorant material into the food product, chewing tobacco, snuff, toothpaste or the like in which the encapsulated flavorant material is employed; thus, the flavorant ingredient is only released when the water-insoluble coating is fractured within the mouth by chewing or other similar forces (for example, brushing when the encapsulated flavorant material is incorporated into a toothpaste). Once the water-insoluble coating has been fractured, the hydrolytic action of the mouth converts the solid hydrophillic core of the encapsulated flavorant material to a liquid emulsion, wherein water is the continuous phase, for releasing flavor at high levels of intensity. When the instant encapsulated flavorant material is used in a chewing gum, the water-insoluble coating should be one which has an affinity for, but is insoluble in, the chewing gum base and thereby prevents the flavorant ingredient from diffusing out into the gum base; this thus provides a minimal dissolution of the flavorant ingredient in the water-insoluble coating or the gum base. The encapsulation of the flavorant ingredient thus prevents chew-out problems and provides highly perceptible flavor at substantially lower levels of flavor oil than conventional free oil or spray dried encapsulation flavorant ingredients.

In the process of this invention, a water-insoluble flavorant ingredient, e.g. essential oils, is admixed with an aqueous encapsulation material comprising gelatin, a natural gum such as gum arabic and/or an albumin such as egg albumin, and a plasticizer to produce an aqueous emulsion wherein the water distillable, i.e. "low boiler" components of the flavorant ingredient are entrapped in a matrix of the gelatin-based encapsulation material during subsequent drying, thereby retaining a substantial portion of the low boiler flavor notes. The resulting emulsion is dried, preferably in a thin layer or sheet, to give a solid emulsion which is ground into a solid base powder having a minimum outer surface area of encapsulation material to volume of encapsulated flavorant ingredient and a relatively high bulk density compared to prior art, hollow spray particulate flavorant materials.

The use of thin film or drum drying for removing water from the aqueous emulsion to produce the solid hydrophilic base powder matrix of this invention has been found to be critical only in the sense that it produces a substantial solid particulate product, rather than the hollow product produced by conventional spray drying. Drying methods such as the improved spray drying of Co-Applicant's U.S. Pat. No. 4,276,312, which also produces substantially solid particulate products, can also be used in this invention. Hollow matrices have internal surfaces which cannot be effectively insolubilized and coated by the water insoluble coating of this invention and have been found to give substantially no delayed release when treated in accordance with the process of this invention, since flavor oil is immediately exposed to the hydrolytic condition of the mouth and/or dissolved in the chewing gum base, giving chew-out problems conventionally know in the art.

In general we prefer to use as the encapsulation material a mixture of gelatin (preferably a high Bloom gelatin having a Bloom of at least 200), albumin (preferably egg albumin) and plasticizer, since we have found that this encapsulation material retains more flavorant and gives a more stable product than the gelatin/natural gum/plasticizer encapsulation material. It is usually helpful to include in the encapsulation material an emulsifier, such as mono- or di-glycerides.

The base powder, which like the spray dried flavorant material disclosed in the U.S. Pat. No. 4,276,312 of one of the Co-Inventors, contains low boiler flavor notes such as acetaldehyde and butyl acetate, can then optionally be coated with gum arabic or gelatin or hardened with a cross-linking agent to seal the matrix for purposes of both slowing down flavor release and preventing the flavorant ingredient from being dissolved in the subsequently applied water insoluble coating material, e.g. polyvinyl acetrate or shellac.

The water insoluble coating, which can be selected from materials such as polyvinyl acetate, shellac, polyvinyl alcohol, zein, high Bloom gelatin (i.e. above 100 Bloom) and ethylcellulose, may be applied to the base powder in the form of either a solution or an emulsion, by blending or spraying in a fluidized bed. Subsequent vacuum or air drying can be used to remove solvent when a solution of polyvinyl acetate, etc., is used. When the encapsulated flavorant material thus produced is used in chewing gum, the water insoluble coating both delays release of the flavorant ingredient in the solid powder matrix and prevents the flavorant ingredient from dissolving in the gum base, which would remove a substantial amount of the available flavorant ingredient needed for acceptable flavor perception levels.

It is believed that the essential features of this invention are: (i) the core matrix which entraps and prevents loss of "low boiler" flavor notes during drying and yet which is partially hydrophilic to give quick and sustained release of flavor at interesting flavor peaks or bursts; and (ii) the water insoluble coating which delays flavorant ingredient release and prevents the flavorant ingredient from dissolving, in the food or other material in which the encapsulated flavorant material is used. Though Applicants do not intend to be bound by any theory or proposed mechanism of operation, it is believed that these essential characteristics of the encapsulated flavorant materials of this invention are obtained by using a core matrix, i.e. base powder of partially hydrophilic and slowly soluble material, which entraps the flavorant ingredient and a coating material that is insoluble in the food or similar material, (e.g. plasticized polyvinyl acetate in the case of a chewing gum) so that the flavorant material remains as a discontinuous phase "encapsulated" within the other components of the food or similar material. When the instant encapsulated flavorant material is used in a chewing gum, the material always remains a separate part of the gum base, protecting the flavorant ingredient from moisture, which might otherwise dissolve the core matrix and allow flavorant ingredient to be released into the gum base components which would permit the flavorant ingredient to be lost or "fixed" in the gum base.

According to a preferred embodiment of this invention, a dried, e.g. drum dried, solid base powder of flavorant ingredient encapsulated in a solid matrix of partially hydrophilic encapsulation material is prepared having the following general formula:

|                              | % By Weight |
| ---------------------------- | ----------- |
| 100 Bloom Gelatin (90% T.S.) | 34.8        |
| Gum Arabic (91% T.S.)        | 34.8        |
| Flavor Oil (e.g. Peppermint) | 25.0        |
| Glycerol (Plasticizer)       | 6.0         |
| BHA                          | 0.2         | wherein 60 parts of the above formula are mixed with 40 parts water in a Hobart mixer. The water is first heated to 130° F. (54.4° C.) and the gum arabic is added and mixed until dissolved. The glycerol and flavor oil are then added while mixing at high speed to emulsify the flavor oil, i.e. approximately 10 minutes. Mixing is then slowed during gelatin addition and then continued at high speed until the gelatin is dissolved.

The resulting liquid emulsion matrix is then dried, e.g. roll dried using 12 psi. steam at 1.1 RPM and a drum gap of 0.020 inch. The resulting dried sheet of solid matrix of encapsulated flavor oil is then milled to a mesh size of between 20–30 to give a solid base powder for secondary treatment or coating.

As already mentioned, the dried powder produced in step (c) of the instant method can either be sealed with gum arabic or gelatin, or treated with a cross-linking agent prior to coating with the water insoluble material in step (d) of the process.

The base powder can be made less water soluble by treatment with a cross-linking agent for the gelatin to seal the solid matrix for reduced rate of flavor release when the flavorant material is chewed and to avoid flavorant ingredient migration and dissolution in the outer water insoluble material coating. The cross-linking agents are selected from the group consisting of glutaraldehyde, acetaldehyde, urea/formaldehyde and tannic acid, with glutaraldehyde being preferred for most flavor oils which are encapsulated by this process. The glutaraldehyde can be sprayed as a solution on a fluidized bed to seal the particle surface prior to secondary coating or can be simultaneously applied within an emulsion or solution of the secondary water insoluble coating. Another method, though less preferred, is to add the cross-linking agent to the wet emulsion matrix prior to roll drying. It should be noted that the cross-linking agent is only applied to the cores of the encapsulated flavorant material after those cores have been formed; the cross-linking agent should not be included in the emulsion prepared in step (a) of the instant method, since it is only desired to cross-link the surface of the solid emulsion matrix, leaving the central part of the core substantially free of cross-linking. Cross-linking of the gelatin-based encapsulation material renders it much less soluble and if the core is cross-linked throughout it will not dissolve satisfactorily in the mouth; however, by applying a solution of cross-linking agent to the pre-formed core, only the part of the core adjacent the water insoluble coating is cross-linked, thus enabling the greater part of flavorant within the non-cross-linked part of the core readily releasable within the mouth.

A continuous coating or film of gum arabic or gelatin applied to the surface of the base powder has also been found to serve the function of giving a more insolubilized core matrix which will keep the flavorant ingredient from migrating to the surface and dissolving or softening the water insoluble outer coating. This gum arabic or gelatin coating is in fact preferred in most instances due to the non-continuous nature of the gelatin matrix outer surface resulting from milling of the solid matrix sheets.

The choice of the particular flavorant ingredient to be encapsulated by the process of this invention affects the processing variables in that certain flavorant ingredients such as spearmint, cinnamon and the fruit oils are good solvents for polyvinyl acetate and will dissolve a polyvinyl acetate coating and migrate into and be entrained in the surrounding food or similar material. These solvent flavorant ingredients must be prevented from contacting the water insoluble coating to a greater degree than peppermint, which will not dissolve polyvinyl acetate or readily migrate into the surrounding material. Therefore, while a certain degree of peppermint flavor oil can be tolerated on the outer surface of the base powder matrix after milling, spearmint oil containing matrix should be cross-linked or coated with a thin film of gum arabic or gelatin of the base matrix, to achieve desired delayed release and yet maintain high water solubility of flavorant ingredient after the water insolubilized outer coating is fractured by chewing in the mouth.

Thus, the use of cross-linking agents or continuous gum arabic or gelatin film is required when flavorant ingredients such as spearmint or cinnamon are used due to the fact that these flavorant ingredients are good solvents for a polyvinyl acetate outer coating and even small amounts of the flavorant ingredients on the surface of the base powder matrix will dissolve the polyvinyl acetate water insoluble coating and thereby prevent delayed release and allow flavorant ingredients to be enrolled in a gum base, or other flavored composition, with resulting problems of flavor "chew-out."

Unlike other flavorant ingredients, peppermint oil does not readily dissolve polyvinyl acetate and therefore a base powder matrix containing peppermint oil can be effectively coated with polyvinyl acetate after cross-linking of the gelatin matrix surface even when some flavor oil migrates to the outer surface due to fracturing of gelatin in milling.

The treated base powder matrix is finally coated with a thin film of a water insoluble polymeric material selected from the group consisting of polyvinyl acetate, shellac, zein, polyvinyl alcohol, high Bloom gelatin (above 100–300 Bloom) and ethyl cellulose, with polyvinyl acetate being preferred, to further seal in the flavorant ingredient and to further insolubilize the encapsulated flavorant ingredient for prolonged delayed release. The coating material will resist being dissolved under the temperature and hydrolytic condition of the mouth and prevent migration of the flavorant ingredient into the food or similar composition yet, when fractured, will allow the moisture of the mouth to contact the solid core emulsion matrix of the base powder and rapidly convert the matrix into a water soluble liquid emulsion wherein water is the continuous phase and will not dissolve into the food or similar composition in preference to release of flavorant ingredient in the mouth.

The polymeric water insoluble coating materials can be applied from solution, e.g. in ethanol, or from emulsions. When applied from solutions, the solution can be sprayed on a fluidized bed of the base powder at a rate which will build a uniform film on the surface of the particles as the solvent is evaporated. Alternately, the solution can be mixed with the base powder in a blender, with subsequent removal of solvent under vacuum, air drying or having the wet material tumbled in a tunnel dryer.

The preferred method of applying the polymeric material, especially polyvinyl acetate, is through use of a food grade emulsion of the polyvinyl acetate in a fluidized bed. Emulsions have the advantage of eliminating the need for solvent recovery and allowing the use of higher molecular weight polymers than in solutions.

As already mentioned, some of the flavorant ingredients which may be used in the encapsulated flavorant materials are solvents for polyvinyl acetate, and thus if polyvinyl acetate is used as the water insoluble coating of the instant encapsulated flavorant material, it is necessary to protect the polyvinyl acetate coating from attack by the flavorant ingredient either by cross-linking the surface of the core or by sealing the core with gelatin or gum arabic. Furthermore, since (as described in more detail below) the instant flavored compositions will often have a second flavorant ingredient which is dispersed within the food or similar material outside the instant encapsulated flavorant material, in many cases it will also be necessary to protect a polyvinyl acetate coating from attack by this "external" flavorant ingredient as well. Protection of the polyvinyl acetate from both flavorant ingredients can be achieved by using a triple coating comprising successive layers of gelatin, polyvinyl acetate and gelatin, but the three separate coating operations necessary to produce this triple coating render this option economically unattractive. Accordingly, when either the encapsulated flavorant ingredient or the external flavorant ingredient is a solvent for polyvinyl acetate, we prefer to use shellac as the water insoluble coating material, since most of the flavorant ingredients whch dissolve polyvinyl acetate do not attack shellac. Although shellac is usually applied for confectionery purposes as an alcoholic solution (known commercially as confectioner's glaze), we do not recommend the use of an alcoholic solution of shellac in step (d) of the instant process since this solution tends to coat rather slowly and produce agglomeration of the encapsulated flavorant material. Although shellac is insoluble in water alone, we have found that an aqueous solution of shellac can be prepared if the solution is made alkaline, and our preferred solution for applying a shellac coating in step (d) of the instant process comprises an aqueous solution of shellac in ammonium hydroxide. Such an aqueous solution of shellac coats much faster and with much less agglomeration than the alcoholic solution.

One possible disadvantage of shellac coatings is that they are not always stable in prolonged contact with food or other compositions (for example, ice cream, chewing tobacco or snuff) containing a large proportion of water. To achieve resistance to both flavorant ingredients and water, it may be desirable to use a mixture of shellac and polyvinyl acetate as the water insoluble coating. Also, although we have found that hydroxypropyl methyl cellulose gives coatings which are markedly inferior to shellac coatings, it appears that a mixture of shellac and hydroxypropyl methyl cellulose may be a useful water insoluble coating material in certain encapsulated flavoring materials of the invention.

The process of this invention can be readily seen from the following detailed description of the Applicants' preferred embodiments of this invention. These embodiments, which are meant to be illustrative of commercially practical processes of this invention, are not to be construed as limiting upon the scope of Applicants' invention.

I. A one thousand pound (454.5 kg.) batch of spearmint delayed release encapsulated flavorant material is prepared by pumping water (748 lb., 340 kg.) into a 250 gal. (940 l.) mixer and heating to 160° F. (71.1° C.). Glycerol plasticizer (58.7 lb., 26,7 kg.) and 100 Bloom type B gelatin (372 lb., 169.1 kg.) are then mixed in until dissolved. Spearmint oil (266 lb., 120.9 kg.), containing 2 lb. (0.91 kg.) of BHA dissolved therein, is then added and mixing is continued until an emulsion is produced.

The liquid emulsion is then dried on a drum dryer at a drum temperature of 274° F. The gap between the rolls is 0.020 inches (0.051 cm.). The dry sheet product is run through a hammer mill and the milled product is sifted through a 20 mesh screen to produce a solid base powder containing a solid emulsion of flavor oil in the encapsulation matrix.

The base powder is then fluidized and sprayed with 61 lb. (27.7 kg.) of a 25% aqueous glutaraldehyde solution, using the following conditions:

Inlet Temperature—38° C.
Outlet Temperature—30° C.
Spray Pressure (Bars)—2.5
Shaker Interval—1.7/3 sec.
Feed Speed—3 liters/min.
Outlet Flaps—36

When complete, the bed fluidization is continued for 10 minutes at an inlet temperature of 50° C.

After 10 minutes, the fluidized base powder is sprayed with 178 lbs. (80.9 kg.) of a 30% aqueous emulsion of polyvinyl acetate using the same conditions used to spray the glutaraldehyde, with the exception that the feed speed is 5 liters/min.

After the polyvinyl acetate coating is completed, fluidization is continued for 10 minutes at a 50° C. inlet temperature. Five kilograms of sodium silico aluminate anti-caking agent is added and fluidization is continued for one minute. The final, free-flowing solid delayed release material is then removed, and sifted through a 20 mesh screen.

II. A second 1,000 lb. (454.5 kg.) batch of spearmint delayed release encapsulated flavorant material is prepared by pumping water (748 lb., 340 kg.) into a 250 gal. (940 l.) mixer and heating to 160° F. (71.1° C.). Glycerol plasticizer (46.5 lb., 21.09 kg.) and 250 Bloom type B gelatin (520.76 lb.), (236.21 kg.) are then mixed in until dissolved. Spearmint oil (242 lb., 109.77 kg.), containing 2.4 lb. (1.09 kg.) of BHA dissolved therein is separately mixed with 93 lb. (42.18 kg.) of egg albumin (this separate mixing of the egg albumin with the spearmint oil has been found to retain the maximum amount of oil in the final product) is then added to the glycerol/gelatin emulsion, together with 28 lb. (12.7 kg.) of mono-and di-glycerides. And mixing is continued until an emulsion is produced.

The drying and milling of the emulsion are then effected in exactly the same manner as for the first batch of encapsulated flavorant material described above and cross-linking of the resultant powder with glutaraldehyde is also effected in the same manner except that only 60 lb. (27.2 kg.) of the 25% aqueous glutaraldehyde solution are used.

The dried, cross-linked powder is then sprayed with 151.52 lb. (68.73 kg.) of a 30% aqueous solution of shellac, this quantity of solution containing 50 lb. (22.68 kg.) of shellac and 4.5 lb. (2.04 kg.) of ammonium. The subsequent treatment of the batch was exactly the same as that of the first batch described above.

The flavorant ingredients used in the practice of this invention comprise primarily water insoluble essential oils, oleo resins, spices, and artificial flavorants. Representative flavorant ingredients, which are of course not all encompassing of flavorant ingredients having utility in the process of this invention, include flavorant ingredients conventionally used in chewing gums and other food or similar products such as essential oils such as lemon, orange, cherry and other fruit oils, spearmint oil, peppermint oil and cinnamon. Where a sugarless product is contemplated, artificial sweeteners such as aspartame may also be incorporated in the flavorant ingredient which is encapsulated by the instant process to give a flavor which also has a desired sweetness.

In some cases, it may be desirable to incorporate a coloring material into the encapsulated flavorant material in order to produce an interesting speckled appearance to the product; for example, if the encapsulated flavorant material is intended to be incorporated into a white toothpaste it may be desired to introduce a red color into the encapsulated flavorant material to provide a red-speckled toothpaste which may be attractive to children. When such a coloring material is to be incorporated, it should be incorporated into the cores of the material, not into the water insoluble coating, since unless the coloring material is sealed by the water insoluble coating, the coloring material will tend to leach out into the composition in which the encapsulated flavorant material is placed, thus producing unattractive smears of color within the material. Accordingly, to produce a colored encapsulated flavorant composition of the invention, the coloring material should be added to the aqueous emulsion formed in step (a) of the instant method. Naturally, if desired, a single instant flavored composition may incorporate more than one different instant encapsulated flavorant material, thus introducing two more more different flavors and/or colors into the flavored composition.

The essential feature of the preferred delayed release flavorant materials of this invention, namely the ability to release a substantial flavor burst after a 3–5 minute delay and maintain a sustained release of flavor at acceptable perception levels, even with substantially less flavorant ingredient than conventional free oils or spray-encapsulated flavorant materials, has been found to be affected by a number of process variables including the particle size of the solid base powder, the choice of particular flavorant ingredient, the Bloom strength of the gelatin used in the base matrix emulsion as well as the use of other components in the matrix, such as maltodextrin, the amount of water insoluble material coating and the method of treating the outer surface of the base powder matrix to seal and insolubilize the outer surface of the base matrix, i.e. cross-linking agents and/or spraying of a thin film of gum arabic or gelatin. To the extent that the choice of flavorant ingredient and the desired release time and texture of the final gum or other food or similar product determine the required process conditions, these process conditions are critically interrelated.

The particular size of the base powder matrix and the final encapsulated material resulting from insolubilization of the outer surface of the base powder must ordinarily be maintained in the range of 20-30 mesh to avoid the undesired perception of large particles in the flavored composition in which the encapsulated flavorant material is used, which, in turn, affects the texture and chewability of the flavored composition. Apart from the size limitation on the final product, it has generally been found that smaller particle size results in slightly longer delay in flavor release. Applicants have thus found that the optimum particle size is therefore in the range of 20-30 mesh, but this can of course be varied within the skill of one in the art for the desired final product.

The encapsulation material used to prepare the base powder matrix of this invention must be partially or slightly hydrophilic to achieve a flavor burst and sustained release of flavor without loss of flavor in the chewing gum base. The use of gelatin with a natural gum and/or albumin has therefore been found to be critical to the practice of this invention, and further has been found to allow retention of the desirable "low boiler" flavor notes by entrapping the water distillable portion of the flavor oils and thereby protecting these low boilers from distillation during drum drying of the liquid emulsion to produce the solid emulsion matrix essential to the practice of this invention. The use of other water soluble matrix materials, such as maltodextrin, in the encapsulation material, is also contemplated by this invention but is less preferred in that maltodextrin is less effective in forming a matrix which will retain low boilers under the heating conditions required for the drum drying of this invention.

The use of a plasticizer, such as glycerol, is essential for drum drying of the liquid emulsion according to the practice of this invention and is therefore an essential part of this invention. The use of other optional additions, such as conventional preservatives like BHA, is also contemplated by this invention.

The texture of the instant encapsulated flavorant material varies with the Bloom strength of the gelatin used in the encapsulation material and also depends upon whether the encapsulation material contains a natural gum or an albumin. The higher the Bloom of the gelatin, the greater the tendency for the encapsulated flavorant material to have a hard, "crunchy" texture which may be objectionable in certain applications. Also, in general, for any given Bloom strength of gelatin, the albumin-containing materials tends to be less crunchy than the gum-containing materials. Of course, the commercial acceptability of a crunchy textured flavorant material depends upon the application in which it is to be employed; for example, a crunchy textured flavorant material might be quite acceptable for use in hard candy or toothpaste, but might be unacceptable for use in a soft fudge or similar material. Also, even in certain food or similar compositions which are normally smooth textured, a crunchy textured flavorant material may be acceptable for its novelty value. For example, a crunchy textured flavorant material may be acceptable as a flavorant for chewing gun because it gives the gum a surprising and not unpleasant grainy texture.

The gelatin used in the encapsulation material can generally be a gelatin having a Bloom of 100–300, with the lower Bloom strength gelatins being preferred from an economic point of view. Gelatins having a Bloom strength of 200 or more have been found to give significant delayed flavor relase and good flavor intensity even when not cross-linked or coated with water insoluble material according to the invention, but their "sandy" or gritty texture may not be acceptable in certain applications. However, such high Bloom gelatins give very good delayed flavor released in applications where a crunchy textured flavorant material is entirely acceptable, such as in crunchy peanut butter or breakfast cereal.

The water insoluble coating materials of this invention are selected from film forming compounds with low water affinity and which are insoluble in the chewing gum base components. Though polyvinyl acetate is highly preferred for its already common acceptance in gum bases for increased chewability of otherwise "plastic" gum resin, other high molecular synthetic resins like polyvinyl alcohol and materials such as zein, ethylcellulose and high Bloom (over 100 Bloom) gelatin also have utility in the practice of this invention. Also, as mentioned above shellac is very useful in this invention.

The water insoluble coating material has been found to be particularly effective in amounts of from 2.5 to 10.0% by weight of the final flavorant material. Amounts of insoluble coating, e.g. polyvinyl acetate or shellac, in excess of 10% by weight will also give delayed release, but the texture of the resulting encapsulated flavorant material has been found to be unacceptably hard or "crunchy" for use in some applications and results in more sustained release of flavor, but at perceptibly lower flavor intensity peaks. The lower limits of coating amount are of course determined by the amount required to provide an effective coating for the desired delayed release; amounts below about 2.5% will result in having the partially hydrophilic or water soluble matrix exposed to the hydrolytic condition of the mouth and therefore fairly rapid flavor release, the delay (if any) being less than the 3-5 minute delay obtained with larger amounts of coating material. Generally, the period of delay of flavor release increases with increased weight percent of insoluble coating material over the range of 2.5 to 10.0%, with less delay and higher flavor peaks noted at 2.5% and greater delay and sustained flavor release, at lesser flavor intensity being noted at the higher end of this range.

As briefly mentioned above, chewing gums and other food and similar products incorporating and encapsulated flavorant material of this invention may also contain one or more "external" flavorant ingredients disposed within the food or similar material but outside the encapsulated flavorant material. Such an external flavorant ingredient may be in any appropriate form. For example, a chewing gum of this invention might have an external conventional flavorant ingredient in the form of a spray-dried encapsulated flavor oil. The encapsulated and external flavorant ingredients need not be of the same flavor, thus resulting in a distinctly "double" flavored gum or other food or similar material. When the instant encapsulated flavorant material used in such a double-flavored food or similar composition provides a substantial delay before release of the encapsulated flavorant ingredient, one obtains the interesting effect of a product which is at first of one flavor but which after a period of chewing suddenly produces a high-intensity burst of another flavor, an effect which cannot be achieved by conventional flavoring techniques.

When polyvinyl acetate is used as the water insoluble coating in an instant encapsulated flavorant material for use in chewing gum, the molecular weight of the resin should be over 2000, as required by FDA regulations for use in gums and has been found to give better results at M.W. of over 14,000 to 40,000 when sprayed in solution and optimally upwards of 500,000, which can be obtained when emulsions of polyvinyl acetate are used for spray coating in fluidized beds. Emulsions of polyvinyl acetate should not, however, be highly polymerized due to the fact that highly polymerized coating, even at low weight percents, will result in delayed release and/or fixation of the flavor to such a degree that the flavor will not "chew-out" over an indefinite period of time.

The process and improved delayed release flavorant chewing gums of this invention are further shown by the following detailed examples, which are meant to be illustrative and not limiting upon the scope of Applicants' invention as subsequently defined in the clais.

EXAMPLES 1-4

Delayed release flavorant materials of this invention were prepared according to the following formulations:

| Ingredient | Ex. 1 | Ex. 2 | Ex. 3 | Ex. 4 |
|---|---|---|---|---|
| 1. Gelatin (100 Bloom-Type B) | 50.0 | 15.0 | 21.0 | 27.4 |
| 2. Gum Arabic | 26.0 | 10.0 | 15.0 | 40.2 |
| 3. High Amylose Starch | — | 50.0 | 40.0 | — |
| 4. Native Spearmint Oil | 13.5 | — | — | 26.4 |
| 5. USP Peppermint Oil | — | 13.5 | — | — |
| 6. Cinnamic Aldehyde | — | — | 13.5 | — |
| 7. Sodium Saccarin | — | 1.5 | — | — |
| 8. Tannic Acid | 0.5 | — | — | — |
| 9. Glutaraldehyde | — | — | 0.5 | 1.0 |
| 10. Polyvinyl Acetate (Mol. Wt. 40,000) | 10.0 | 10.0 | 10.0 | — |
| 11. Polyvinyl Acetate (Mol. Wt. 500,000) | — | — | — | 5.0 |

In each of the above examples, the first seven numbered ingredients are admixed in accordance with the general procedures set forth above to give a liquid emulsion, which when drum dried and milled, gives the base powder matrix of this invention. In particular, approximately 60 parts of water is mixed with 40 parts of the above formulas (excluding polyvinyl acetate) in a planetary mixer wherein the water is first heated to 130° F. (54.4° C.), gum arabic is added and mixed until dissolved, followed by admixing of the flavor oil and starch, if any, at high speed to emulsify the flavor oil. Mixing is then slowed while gelatin is added and high speed mixing begins until the gelatin is dissolved. The sodium saccharin in Example 2 is added to the flavor oil prior to admixing with gum arabic and water.

The liquid emulsion is then roll dried under the conditions set forth above for the preferred embodiment of this invention and milled to a mesh size of 20-30 to give the base powder for secondary coating.

In Examples 1-3, the coating of the base powder with items 8 through 10 is performed by first preparing a polyvinyl acetate solution containing 30 parts poyvinyl acetate, 63 parts ethanol and 7 parts water, wherein the glutaraldehyde or tannic acid insolublizing or cross-linking agent is pre-dissolved.

The base powder is then mixed with the polyvinyl acetate solution in a ribbon type mixer and the mixture is allowed to run until the particulate product is free flowing, i.e. until the solvents are evaporated. Alternatively, the coated particles are placed on trays after five minutes mixing and the solvent is allowed to evaporate at room temperature or in a hot air oven (120° F., 48.9° C.) for four hours.

In Example 4, the base powder is first sprayed with a 25% solution of glutaraldehyde and then coated with a 30% emulsion of polyvinyl acetate while fluidized according to the preferred process described above. After coating, the coated solid matrix is mixed with a sodium silico aluminate flow agent under fluidization for one minute to produce a solid particle, free flowing product which is sifted through a 20 mesh screen and stored for use in chewing gums.

The following examples illustrate a longer lasting flavor chewing gum (Example 5) and a chewing gum with a dual flavor, i.e. double flavor gum (Example 6) prepared using the delayed release flavorant material prepared by the process of this invention. The chewing gum base is selected from conventionally available chewing gum bases and does not form a part of this invention. Similarly, the encapsulated flavor oils used with the delayed release flavorant material are conventional and have been prepared by the process disclosed in Co-Applicant's U.S. Pat. No. 4,276,312.

EXAMPLES 5 and 6

Chewing gums were prepared from the following formulas:

|  | Example 5 - % by wt. | Example 6 - % by wt. |
|---|---|---|
| 10X Sugar | 58.85 | 58.85 |
| Conventional Gum Base ("Dreyco") | 20.50 | 20.50 |
| 44° Brix Corn Syrup | 14.50 | 14.50 |
| Delayed Release Spearmint (13.3% Oil) | 3.00 | — |
| Conventional Encapsulated Spearmint Oil (15% Oil) | 2.25 | — |
| Conventional Encapsulated Cherry (15% Oil) | — | 2.25 |
| Delayed Release Peppermint (13.5% Oil) | — | 3.00 |
| Corn Oil | 0.60 | 0.60 |
| Lecithin | 0.30 | 0.30 |

The gums were prepared by blending the gum base at 170° F. (76.7° C.) with lecithin, corn oil and delayed release flavorant materials in a Baker-Perkins mixer for 3 minutes. The corn syrup and sugar are than added and mixed for 2 minutes. The conventional encapsulated flavor is then added and mixed for another 2 minutes. The resulting gum mass, which is now at a temperature of about 140° F. (60.0° C.) is then removed from the mixer, dusted with a very small amount of 10X sugar, rolled and scored into sticks of gum according to conventional processing techniques.

The gums prepared using the instant delayed release flavorant materials which contained less than 0.75% flavor, compared to normal gums containing 1.0% or more flavor, exhibited stronger and longer lasting flavor perception than conventional gums while giving two distinctly perceptible flavors in the case of Example 6.

EXAMPLES 7 and 8

Delayed release flavorant material of this invention were also prepared from the following formulas:

| Ingredients | Example 7 | Example 8 |
|---|---|---|
| 1. Gelatin (100 Bloom-Type B) | 31.45 | 30.5 |
| 2. Gum Arabic | 31.85 | 35.3 |
| 3. Native Spearmint Oil | 25.0 | — |
| 4. USP Peppermint Oil | — | 19.3 |
| 5. Glycerol | 5.5 | 4.7 |
| 6. BHA | 0.2 | 0.2 |
| 7. Glutaraldehyde | 1.0 | — |
| 8. Gelatin (200 Bloom) | 5.0 | — |
| 9. Ethylcellulose (10% Solution) | — | 10.0 |

The delayed release flavorant material of example 7 was prepared by the same procedure described in example 4, above, with exception that the fluidized base powder was first coated with a 20% solution of 200 Bloom Gelatin and then sprayed with 25% solution of glutaraldehyde to cross-link the high Bloom gelatin water-insoluble coating.

The delayed release flavorant material of example 8 was prepared according to the procedure set forth in examples 1-3, above Though the high Bloom gelatin (example 7) and ethylcellulose (example 8) coated flavorant material did not achieve the same degree of delayed or delayed flavor release as that obtained with polyvinyl acetate (i.e., 3-5 minutes delay) both gave acceptable flavor release at about 2 minutes delay and extended flavor release up to about 5-6 minutes chewing time.

While the above examples are for sugar gums, the same flavor systems work equally well with sugarless gums wherein artificial sweeteners such as aspartame can be mixed with the flavor oil prior to delayed release encapsulation.

The delayed release flavorant materials of this invention have thus made it possible to prepare a single piece of chewing gum with two distinct flavors, e.g. a conventional encapsulated cherry flavor which can be tasted for approximately the first 3 minutes of chewing and thereafter a delayed release peppermint flavor which becomes perceptible after approximately 3 minutes and reaches a flavor peak at 4-5 minutes and a sustained release for 8-10 minutes of chewing.

Moreover, chewing gums presently on the market have the following problems: (1) 1.0% or more of expensive flavor oil is required to obtain acceptable initial flavor perception (10 times that required in other confections) due to the fact that flavor oils have a great affinity for the chewing gum base and become locked in and not perceptible, as shown by analysis of cud after 4 hours of chewing wherein 80% of the added flavor oil still remains; and (2) even at 1.0% or more flavor oil levels, acceptable perception levels last only about 2-3 minutes. Both of these deficiencies have been substantially overcome by chewing gums prepared with the delayed release flavorant materials of this invention, which reach even higher flavor levels and maintain highly perceptible flavor over a period of 3-6 or even 8 minutes of chewing and which are highly compatible with spray encapsulated flavorant ingredients having moderately high perception levels (but not as high as the delayed release flavorant material) over 1-2 minutes of chewing.

In summary, it is the essential feature of this invention, as applied to chewing gums, to provide a method for preparing a solid matrix of water insoluble flavors containing low boiler flavor notes in a partially hydrophilic solid emulsion of encapsulating material which is treated, i.e. coated with a cross-linking agent or thin coating of gelatin or gum arabic and a coating of water insoluble material to insolubilize the outer surface of the flavor matrix wherein the insolubilized outer coating delays release of flavorant ingredient in the mouth or migration of flavorant ingredient into the gum base until fractured and thereafter the hydrolytic condition of the mouth converts the solid emulsion matrix to a liquid emulsion where water is in the continuous phase for rapid and sustained release of a substantial flavor "burst" and yet the physical state of the liquid emulsion prevents the flavorant ingredient from being dissolved in the water insoluble coating or chewing gum base and thereby prevents the fixation of flavorant ingredient in the base which results in flavor "chew-out" problems and the use of excessive amounts of flavor to achieve acceptable consumer flavorant ingredient perception levels.

Applicants having disclosed their invention, obvious modifications will become apparent to those skilled in the related art. Applicants therefore intend to be limited only by the scope of the appended claims.

We claim:

1. A method for preparing a solid encapsulated flavorant material for use in compositions intended to be placed in the mouth, the method comprising steps of:
    (a) preparing an aqueous emulsion of a flavorant ingredient, which flavorant ingredient comprises water distillable components, in an at least partially hydrophilic gelatin-based encapsulation material selected from the group consisting of a mixture of gelatin, a natural gum and a plasticizer, and a mixture of gelatin, an albumin and a plasticizer;
    (b) drying said emulsion to produce a uniform solid matrix product having the flavorant ingredient containing substantially all of its water distillable components within a solid emulsion matrix of said encapsulation material;
    (c) milling said dried solid matrix to a particle size of less than 20 mesh to produce solid powder; and
    (d) coating said solid powder with a water insoluble material selected from the group consisting of polyvinyl acetate, shellac, polyvinyl alcohol, zein, high Bloom gelatin having a Bloom of over 100 to 300 and ethylcellulose to produce an encapsulated flavorant material having a relatively thin water insoluble coating which delays release of said flavorant ingredient within the mouth for a controlled period of time and yet which will thereafter release substantially all of said flavorant ingredient's original flavor notes at desired flavor levels and over a sustained period of time without having significant amounts of said flavorant ingredient dissolved in the water insoluble coating material.

2. The method of claim 1 wherein the water insoluble coating is such that the delayed release of flavorant ingredient occurs after about two or more minutes of chewing in the mouth.

3. The method of claim 1 wherein in step (d) said solid powder is coated successively with layers of gelatin, polyvinyl acetate and gelatin.

4. The method of claim 1 wherein the encapsulation material comprises a mixture of gelatin, an albumin and a plasticizer and wherein the water insoluble material is shellac.

5. The method of claim 4 wherein the albumin is egg albumin.

6. The method of claim 4 wherein the shellac is admixed with hydroxypropyl methylcellulose.

7. The method of claim 1 wherein the flavorant ingredient is selected from the group consisting of essential oils, oleo resins, imitation flavors, fragrances and mixtures thereof.

8. The method of claim 1 wherein the drying in step (b) is performed in a drum dryer.

9. The method of claim 1 wherein the water insoluble coating comprises from about 2.5 to about 10% by weight of the flavorant composition and the water insoluble coating is such that the delayed release of flavorant ingredients occurs from 3-10 minutes after initial chewing of a gum containing said encapsulated flavorant material.

10. The method of claim 1 wherein the milled powder produced in step (c) is treated, prior to being subjected to step (d) with an aqueous solution of a cross-linking agent selected from the group consisting of glutaraldehyde and tannic acid to further seal the powder.

11. The method of claim 10 wherein the cross-linking agent is glutaraldehyde.

12. The method of claim 1 wherein the powder produced in step (c) is treated with an aqueous solution of gum arabic to further seal the powder prior to coating with the water insoluble material in step (d).

13. The method of claim 1 wherein a cross-linking agent selected from the group consisting of glutaraldehyde and tannic acid is added to an emulsion of the water insoluble material, which emulsion is then used to form the water insoluble coating in step (d).

14. The method of claim 13 wherein the cross-linking agent is glutaraldehyde and the water insoluble coating comprises polyvinyl acetate, and wherein step (d) is effected by spraying a glutaraldehyde and polyvinyl acetate emulsion is sprayed onto a fluidized bed of the powder produced in step (c).

15. The method of claim 1 wherein the gelatin used in step (a) is a gelatin having a Bloom of from 100-300.

16. The method of claim 1 wherein the water insoluble material is polyvinyl acetate and is present in the amount of about 2.5 to about 10.0% by weight of the final flavorant material.

17. The method of claim 16 wherein the polyvinyl acetate is sprayed in the form of an emulsion onto a fluidized bed of the powder produced in step (c).

18. The method of claim 17 further comprising the step of contacting the powder produced in step (c) with an aqueous solution of glutaraldehyde to cross-link the surface of the matrix and thereby provide a sealed particle for slower release and better subsequent coating with the polyvinyl acetate in step (d).

19. The method of claim 17 wherein the powder produced in step (c) is coated with an aqueous solution of gum arabic to seal the powder for slower release and better subsequent coating with he polyvinyl acetate in step (d).

20. The method of claim 1 wherein the water insoluble material used in step (d) is shellac present in an amount of from about 2.5%–10.0% by weight of the final flavorant material and the coating in step (d) is effected by contacting the powder produced in step (c) with an alkaline aqeuous solution of shellac.

21. The method of claim 20 wherein the aqueous alkaline solution comprises shellac dissolved in aqueous ammonia.

22. The method of claim 20 wherein the alkaline aqueous solution of shellac is sprayed onto a fluidized bed of the powder produced in step (c).

23. The method of claim 22 further comprising the step of contacting the powder produced in step (c) with an aqueous solution of glutaraldehyde to cross-link the surface of the matrix and thereby provide a sealed particle for slower release and better subsequent coating with the shellac in step (d).

24. The method of claim 22 wherein the powder produced in step (c) is coated with an aqueous solution of gum arabic to seal the powder for slower release and better subsequent coating with the shellac in step (d).

25. The method of claim 1 wherein the aqueous emulsion prepared in step (a) also comprises a coloring material.

26. The method of claim 1 wherein the plasticizer comprises glycerol.

27. An encapsulated flavorant material for use in compositions intended to be placed in the mouth and comprising a hydrophilic core and a water insoluble coating surrounding the hydrophilic core, said hydrophilic core comprising a flavorant ingredient having water distillable components dispersed within a solid matrix of a gelatin-based encapsulation material selected from the group consisting of a mixture of gelatin, a natural gum and a plasticizer and a mixture of gelatin, an albumin and a plasticizer, and said water insoluble coating comprising a water insoluble material selected from the group consisting of polyvinyl acetate, shellac, polyvinyl alcohol, zein, high Bloom gelatin having a Bloom of over 100 to 300 and ethylcellulose.

28. The material of claim 27 wherein the encapsulation material comprises a mixture of gelatin, a natural gum and a plasticizer and wherein the water insoluble material is selected from the group consisting of polyvinyl acetate, polyvinyl alcohol, zein, high Bloom gelatin having a Bloom of over 100 to 300 and ethylcellulose.

29. The material of claim 27 wherein the encapsulation material comprises a mixture of gelatin, an albumin and a plasticizer and wherein the water insoluble material comprises shellac.

30. The material of claim 29 wherein the albumin is egg albumin.

31. The material of claim 29 wherein the water insoluble material comprises a mixture of shellac and hydroxypropyl methylcellulose.

32. The material of claim 27 where the water insoluble coating comprises from about 2.5 to about 10% by weight of the flavorant composition.

33. The material of claim 27 wherein the outer part of the hydrophilic core adjacent the water insoluble coating is at least partially cross-linked, while the central part of the hydrophilic core is substantially free of cross-linking.

34. The material of claim 27 wherein a coating of a sealant selected from the group consisting of gelatin and gum arabic surrounds the hydrophilic core and lies between the hydrophilic core and the water insoluble coating.

35. The material of claim 27 wherein the gelatin in the hydrophilic core has a Bloom of from 100 to 300.

36. The material of claim 27 where the water insoluble material is polyvinyl acetate and is present in an amount of about 2.5 to about 10% by weight of the encapsulated flavorant material.

37. The material of claim 27 wherein the core further comprises a coloring material.

38. The material of claim 27 wherein the plasticizer comprises glycerol.

39. A flavored composition for introduction into the mouth, the composition comprising a non-toxic material selected from the group consisting of food products, chewing tobacco, snuff and toothpaste, and an encapsulated flavorant material according to claim 26.

40. The flavored composition of claim 39 wherein the encapsulation material comprises a mixture of gelatin, a natural gum and a plasticizer and wherein the water insoluble material is selected from the group consisting of polyvinyl acetate, polyvinyl alcohol, zein, high Bloom gelatin having a Bloom of over 100 to 300 and ethylcellulose.

41. The flavored composition of claim 39 wherein the encapsulation material comprises a mixture of gelatin, an albumin and a plasticizer and wherein the water insoluble material comprises shellac.

42. The flavored composition of claim 39 wherein the water insoluble coating of the encapsulated flavorant material comprises from about 2.5 to about 10% by weight of the encapsulated flavorant material.

43. The flavored composition of claim 39 wherein, in the encapsulated flavorant material, the outer part of the hydrophilic core adjacent the water insoluble coating is at least partially cross-linked, while the central part of the hydrophilic core is substantially free of cross-linking.

44. The flavored composition of claim 39 wherein, in the encapsulated flavorant material, a coating of a sealant selected from the group consisting of gelatin and gum arabic surrounds the hydrophilic core and lies between the hydrophilic core and the water insoluble coating.

45. The flavored composition of claim 39 wherein at least some of the cores of the encapsulated flavorant material comprise a coloring material.

46. The flavored composition of claim 39 wherein said non-toxic material further comprises at least one additional flavorant ingredient in conventionally available form.

47. The flavored composition of claim 39 wherein said non-toxic material comprises a chewing gum base, said flavored composition thus being a chewing gum.

48. The flavored composition of claim 47 wherein said chewing gum base comprises at least one additional flavorant ingredient in conventionally available form.

49. The flavored composition of claim 48 wherein the additional flavorant ingredient is a spray-dried encapsulated flavorant oil.

50. The flavored composition of claim 47 wherein said encapsulated flavorant material has its water insoluble coating of such a thickness that release of flavorant ingredient from the cores of the encapsulated flavorant material is delayed until the flavored composition has been chewed in the mouth for about two or more minutes.

51. The flavored composition of claim 47 wherein the water insoluble coating of the encapsulated flavorant material comprises from about 2.5 to about 10% by weight of the encapsulated flavorant material.

52. The flavored composition of claim 47 wherein, in the encapsulated flavorant material, the outer part of the hydrophilic core adjacent the water insoluble coating is at least partially cross-linked, while the central part of the hydrophilic core is substantially free of cross-linking.

53. The flavored composition of claim 39 wherein, in the encapsulated flavorant material a coating of a sealant selected from the group consisting of gelatin and gum arabic surrounds the hydrophilic core and lies between the hydrophilic core and the water insoluble coating.

54. The flavored composition of claim 39 wherein said non-toxic material comprises toothpaste.

55. The flavored composition of claim 54 wherein at least some of the cores of the encapsulated flavorant material comprise a coloring material.

56. The flavored composition of claim 39 wherein said non-toxic material comprises chewing tobacco.

57. The flavored composition of claim 39 wherein said non-toxic material comprises snuff.

* * * * *